United States Patent [19]

Kamata

[11] Patent Number: 5,394,211
[45] Date of Patent: Feb. 28, 1995

[54] LENS-FITTED PHOTOGRAPHIC FILM PACKAGE

[75] Inventor: Kazuo Kamata, Saitama, Japan

[73] Assignee: Fuji Photo Film Co., Ltd., Kanagawa, Japan

[21] Appl. No.: 134,549

[22] Filed: Oct. 12, 1993

[30] Foreign Application Priority Data

Oct. 12, 1992 [JP] Japan .................. 4-272988
Oct. 15, 1992 [JP] Japan .................. 4-277467

[51] Int. Cl.⁶ ............... G03B 17/36; G03B 17/42; G03B 17/26
[52] U.S. Cl. .................. 354/217; 351/204; 351/275
[58] Field of Search ......... 354/288, 275, 217, 218, 354/173.11; 242/71.1

[56] References Cited

U.S. PATENT DOCUMENTS

| | | | |
|---|---|---|---|
| 4,351,598 | 9/1982 | Suzuki et al. | 354/288 |
| 4,395,748 | 7/1983 | Killian, Jr. | 362/8 |
| 4,432,621 | 2/1984 | Suzuki et al. | 354/403 |
| 4,544,251 | 10/1985 | Haraguchi et al. | 354/288 |
| 4,860,037 | 8/1989 | Harvey | 354/21 |
| 4,884,087 | 11/1989 | Mochida et al. | 354/75 |
| 4,908,641 | 3/1990 | Fairman | 354/275 |
| 4,954,857 | 9/1990 | Mochida et al. | 354/75 |
| 5,001,505 | 3/1991 | Tosaka et al. | 354/173.1 |
| 5,003,330 | 3/1991 | Kotani et al. | 354/145 |
| 5,140,354 | 8/1992 | Burnham | 354/203 |
| 5,150,140 | 9/1992 | Kitazawa | 354/145.1 |
| 5,181,057 | 1/1993 | Takagi et al. | 354/94 |

*Primary Examiner*—Michael L. Gellner
*Assistant Examiner*—Nicholas J. Tuccillo
*Attorney, Agent, or Firm*—Young & Thompson

[57] ABSTRACT

A lens-fitted photographic film package has a sprocket which is disposed below an exposure frame of the film package. Film advance mechanisms, including a film winding wheel and a film stop device for stopping advance of the film each time the film has been advanced by one frame, and a frame number count device, may be respectively disposed in the upper or lower portion of the film package so as to cooperate with the sprocket. In a film package with flash unit, all these mechanisms are disposed in the lower portion of the film package, and a printed circuit board as well as a light emitting portion of the flash unit are disposed in the upper portion. The printed circuit board is placed horizontally above the film roll chamber and the exposure chamber, while electric elements mounted thereon are disposed on both horizontal sides of a viewfinder of the film package which is disposed above the exposure chamber.

20 Claims, 7 Drawing Sheets

LENS-FITTED PHOTOGRAPHIC FILM PACKAGE

BACKGROUND OF THE INVENTION

1. Field of the Invention

The present invention relates to a lens-fitted photographic film package which has a simple exposure mechanism and contains a roll of unexposed 35 mm photographic film. More particularly, the present invention relates to a lens-fitted photographic film package having a sprocket disposed in a lower portion thereof.

2. Description of Related Art

As described in U.S. Pat. No. 4,884,087 and U.S. application Ser. No. 08/062,185 filed on May 17, 1993, a lens-fitted photographic film package (hereinafter referred to as a film package) contains a roll of unexposed photographic film attached to a cartridge, both disposed in a main body section. Front and rear cover sections are secured to the main body section to close the film package in a light-tight fashion. The main body section is constituted of an exposure chamber forming an exposure frame, and chambers disposed on opposite sides of the exposure chamber for holding the film roll and the cartridge, respectively.

The photographic film contained in the conventional film package is 35 mm roll film of ISO 135-type (International Organization for Standardization: 1007-1979). The 135-type film has perforations formed along both longitudinal side edges thereof. The perforations have previously been utilized to advance the film by a sprocket wheel having sprockets engaging in the perforations. But recently, most compact cameras advance the film by directly rotating a wind-up spool for winding up the film thereon. Therefore, the perforations are now chiefly used, again in cooperation with a sprocket wheel, to measure the amount of advance of the film so as to advance the film in increments of one exposure frame, that is, 38 mm in the 135-type film, since eight perforations are formed on either side of each frame recording area of the film. In the film package, a sprocket wheel (hereinafter referred to simply as a sprocket) also engages in the perforations so as to utilize the perforations not only for detecting one frame advance of the film but also for charging or cocking a shutter of the film package.

However, in order to detect that the film has been advanced by one exposure frame, it would be simpler to provide only one perforation for each frame recording area than to count every eight perforations. Also, the circuitry for detecting the advanced film amount could thus be simplified. For this reason, a 35 mm roll film has been proposed that has only one perforation for each frame recording area, on one longitudinal side edge of the film.

However, such a film having only one perforation for each frame recording area cannot be loaded in the compact cameras having a sprocket. To solve this problem, Fuji Photo Film Co., Ltd., the assignee of this application, is developing such a 35 mm roll film that has eight perforations on one longitudinal side of each frame recording area and only one perforation on the opposite longitudinal side thereof, so as to be usable in either the conventional compact cameras having the sprocket or new type compact cameras having no sprocket and detecting one perforation for each film advance.

FIG. 7 shows a 35 mm roll film having a new perforation format that is proposed by Fuji but not yet published. Specifically, a film 2 pulled out of a cartridge 1 has perforations 4 on one longitudinal side thereof at intervals of eight perforations per full-size frame recording area 5, as in the conventional ISO 135-type film. The perforations 4, hereinafter referred to as successive perforations 4, are located on the upper side, as shown in FIG. 7, when the cartridge 1 is loaded in a cartridge chamber of most types of conventional compact cameras, wherein the film 2 is advanced one frame after each exposure by winding up the film 2 from the cartridge 1 onto the take-up spool of the compact camera. It is to be noted that the cartridge chamber and thus the cartridge 1 are disposed on the left side of the compact camera when viewed from the rear of the compact camera, as shown in FIG. 7, while the take-up spool is disposed on the right side. This arrangement is desirable for manually rotating the take-up spool with the right hand.

The film 2 also has perforations 6 on the other longitudinal side thereof at intervals of one perforation per full-size frame recording area 5. Each perforation 6, hereinafter referred to as the frame index perforation, is located on the lower side of the camera. Besides the perforations 4 and 6, the film 2 has several perforations in a tongue or film leader 3 for securing the film 2 to the wind-up spool of the camera. Since the sprocket of conventional compact cameras is disposed above the exposure frame, the sprocket can be suitably engaged in the successive perforations 4.

However, the roll film as shown in FIG. 7 cannot be used in a conventional film package. In the conventional film package, a film winding wheel is disposed on the right side so as to permit winding of the film with the right hand, in the same way as the compact camera, though the film winding wheel is disposed above the cartridge chamber. This is because the photographic film of the film package is previously pulled out from the cartridge and wound in a roll, and thereafter the cartridge and the roll of film are respectively placed in the cartridge chamber and the film roll chamber which are respectively disposed on the right and left sides of the film package when viewed from the rear. The film is advanced one frame after each exposure, from the film roll chamber into the cartridge, by rotating the film winding wheel. Therefore, if the roll film shown in FIG. 7 were to be used in a conventional film package, the cartridge 1 would be positioned in the right side, and the successive perforations 4 would be located on the lower side.

Since the sprocket of the film package is also disposed above the exposure frame in the vicinity of the film winding wheel and other film advancing and frame number counting mechanisms, it is impossible to adapt the roll film of FIG. 7 to the conventional film package. It might be possible to arrange the successive perforations 4 and the frame index perforation 6 in positions as shown in FIG. 8, that is, opposite the positions shown in FIG. 7, so that the roll film having the new format perforations 4 and 6 could be adapted to the conventional film package. However, the roll film as shown in FIG. 8 cannot be loaded in most compact cameras wherein the sprocket is disposed above the exposure frame. Therefore, such a film would not be feasible.

Meanwhile, film packages with an incorporated flash unit are also known. The flash unit is constituted of a light emitting portion and a printed circuit board. The light emitting portion is disposed above the film roll chamber and the printed circuit board, having electric elements such as a transformer and a capacitor mounted thereon, is disposed between the main body section and the front cover section. Conventionally, the space X for the electric elements is disposed between the film roll chamber 7 and the exposure frame 8, as is shown in FIG. 9, or on the right side of the film roll chamber 7, as is shown in FIG. 10, when viewed from the front. In either case, the film package with the flash unit has a greater horizontal length than the ordinary or standard film package.

It is to be noted that FIGS. 9 and 10 schematically show examples of arrangement of essential portions of the film package with flash unit, wherein reference numerals 9, 10, 11 and 12 designate the cartridge chamber, a film advance wheel, a viewfinder and the flash unit, respectively.

SUMMARY OF THE INVENTION

In view of the foregoing, an object of the present invention is to provide a film package which contains a roll film having frame index perforations on that longitudinal side thereof which would be located below the exposure frame were that roll film to be loaded in a conventional camera, and also having successive perforations on the opposite longitudinal side.

Another object of the present invention is to provide a film package with flash unit, which is compact and has a lesser horizontal length than the conventional film package with flash unit.

The above and other objects of the present invention are achieved by disposing a sprocket below the exposure frame of a film package. A film winding device, as well as a film stop device for stopping the advance of the film each time the film has been advanced by one frame, and a frame number count device may be respectively disposed in the upper or lower portion of the film package so as to cooperate with the sprocket.

In a film package with flash unit according to the invention, all these mechanisms are disposed in the lower portion of the film package, and a printed circuit board as well as a light emitting portion of the flash unit are disposed in the upper portion. The printed circuit board is preferably placed horizontally above the film roll chamber and the exposure chamber, while electric elements mounted thereon are disposed on both horizontal sides of a viewfinder of the film package which is disposed above the exposure chamber.

BRIEF DESCRIPTION OF THE DRAWINGS

Other objects and advantages of the present invention will become apparent in the following detailed description of the preferred embodiments when read in connection with the accompanying drawings, wherein like reference numerals designate like or corresponding parts throughout the several views, and wherein.

DETAILED DESCRIPTION OF PREFERRED EMBODIMENTS

Figure 1:
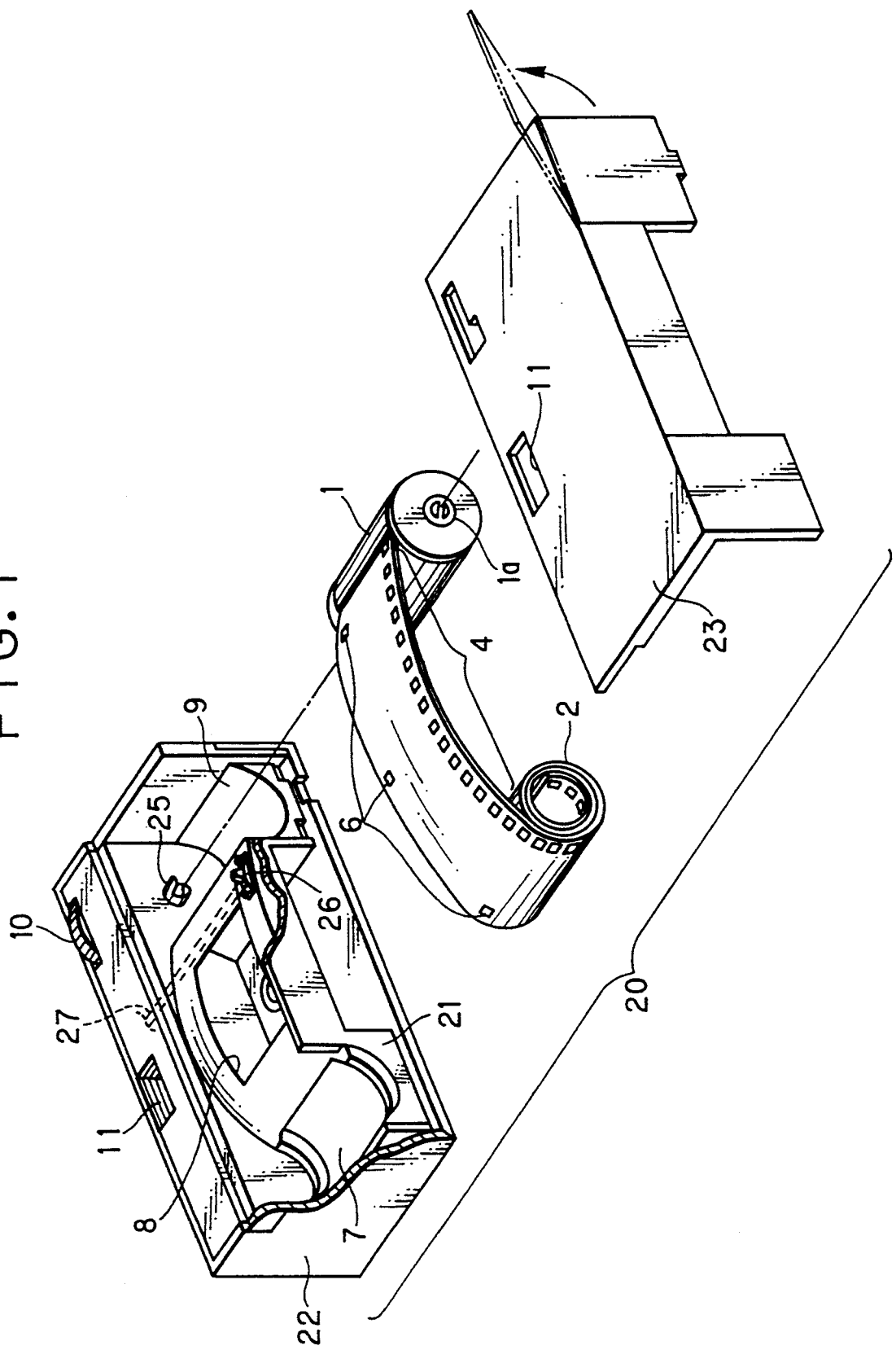
FIG. 1 is an exploded rear and bottom perspective view of a film package according to an embodiment of the invention.
Figure 2:
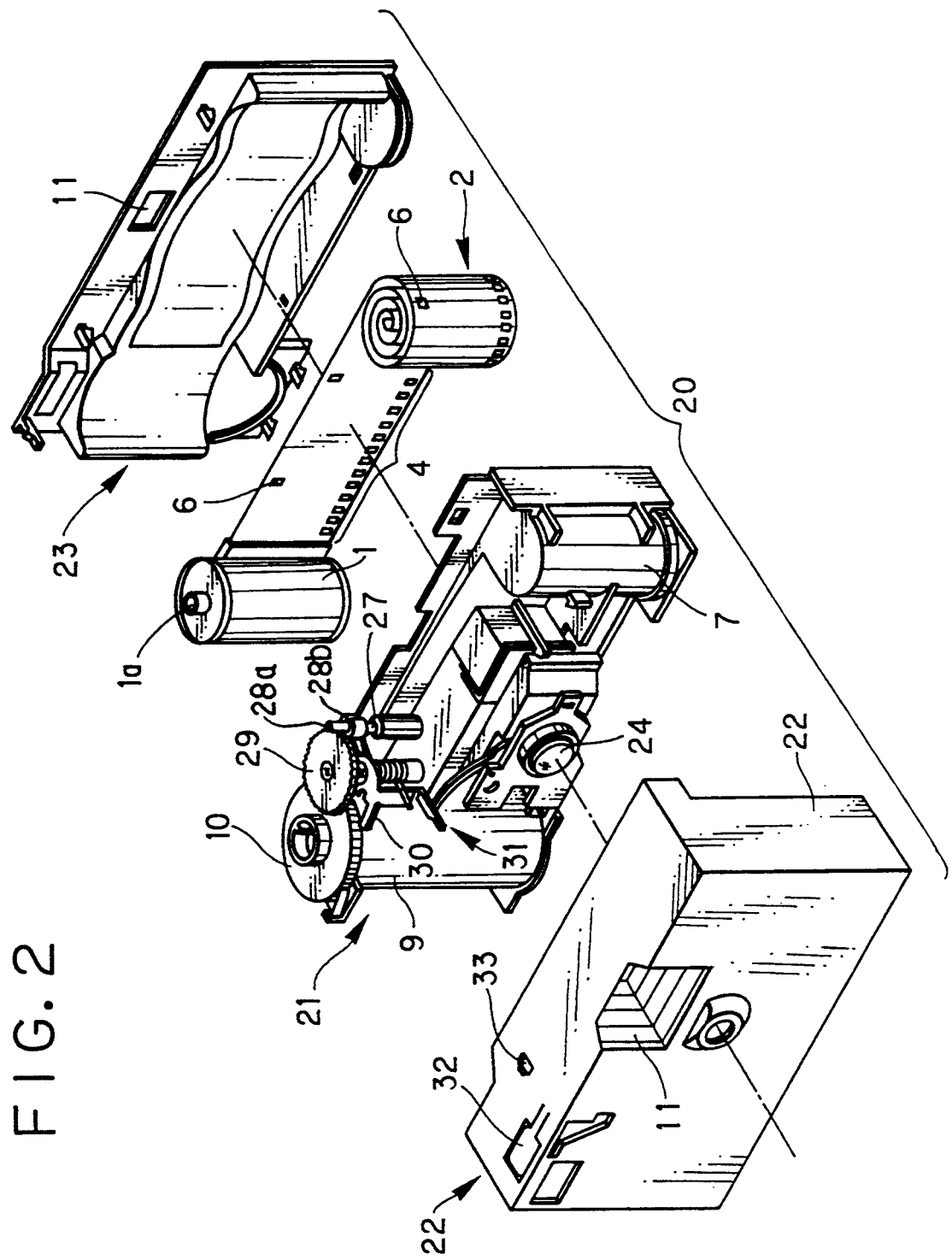
FIG. 2 is an exploded front and top perspective view of the film package shown in FIG. 1.

FIGS. 1 and 2 are exploded perspective views of a film package according to a first embodiment of the invention. A package body 20 is constituted of a main body section 21 and front and rear cover sections 22 and 23 which are secured to the front and rear sides of the main body section 21 by snap-in engagement. The package body 20 contains a film cartridge 1 and a 35 mm film 2 pulled out from the cartridge 1 and wound in a roll. The film 2 has frame index perforations 6 formed along one longitudinal side edge thereof which is located above an exposure frame 8 in the package body 20. The film 2 also has successive perforations 4 along the side edge thereof opposite the frame index perforations 6, that is, on the lower side in the package body 20, at intervals of eight perforations per full-size frame recording area, as in conventional format 35 mm film.

The main body section 21 has a cartridge chamber 9 and a film roll chamber 7 formed on opposite horizontal sides of the exposure frame 8, so as to hold the cartridge 1 and the roll of film 2, respectively. A taking lens 24 is disposed in front of the exposure frame 8. A film advance wheel 10 is disposed on top of the cassette chamber 9, and has a fork 25 integrally formed on the underside of the wheel 10 and protruding into the cartridge chamber 9 so as to engage one end of a spool 1a of the cartridge 1.

A sprocket 26 is rotatably mounted on the main body section 21 below the exposure frame 8, so as to engage the successive perforations 4. When the film 2 is wound up into the cartridge 1 by rotating the film advance wheel 10, the sprocket 26 is rotated by the movement of the film 2 by virtue of the engagement with the successive perforations 4. The sprocket 26 is secured to a shaft 27 which is rotatably mounted in the main body section 21. A one pitch advance member 28a is mounted on the end of the shaft 27 opposite from the sprocket 26, that is, on the upper end of the shaft 27, and meshes with a frame counter disc 29 having gear teeth formed around the periphery thereof. When the sprocket 26 is rotated by an amount corresponding to the advance of the film 2 by one frame, the one pitch advance member 28a causes the frame number counter disc 29 to rotate by one step so as to count down the number of unexposed picture frames.

The sprocket 26 is also coupled to a film stop mechanism comprising a lock pawl 30 through the shaft 27 and a cam 28b, such that the lock pawl 30 is brought into engagement with gear teeth formed around the periphery of the film advance wheel 10 so as to lock the same when the film 2 is advanced by one frame. Furthermore, a self-cocking mechanism 31 is coupled to the sprocket 26 through the film stop mechanism so as to cock a shutter (not shown) of the film package simultaneously with the one frame advance of the film 2. The details of these mechanisms are described in U.S. patent application Ser. No. 08/062,185 or U.S. Pat. No. 4,884,087.

The front cover section 22 has a front window of a viewfinder 11, a frame number display window 33 for revealing a display of the frame counter disc 29, and several openings for exposing the taking lens 24, the film advance wheel 10 and other necessary parts. The front cover section 22 also has a shutter release button 32 integrally formed on the top wall portion thereof. The rear cover section 23 has a rear window of the viewfinder 11. It is to be noted that the package body 20 is encased in a cardboard box or wrapped with a card when marketed and used as a film package. The cardboard box or card has information about the film package and decorative patterns or the like printed thereon.

The above-described film package operates as follows:

When the film advance wheel 10 is manually rotated, the spool 1a is rotated by virtue of the engagement with the fork 25 integrally formed with the film advance wheel 10. The film 2, being secured at one end to the spool 1 a, is thereby wound into the cartridge 1. While the film 2 is being thus advanced, the sprocket 26 is rotated by virtue of the engagement with the perforations 4 of the film 2. The one pitch advance member 28a is rotated by the sprocket 26 through the shaft 27, so as to rotate the frame number counter disc 23 by one step when the film 2 has been advanced by one frame. As a result, the number of unexposed picture frames displayed through the frame window 33 is changed correspondingly. Simultaneously, the shutter is cocked. Finally, the film advance wheel 10 is locked by the lock pawl 30.

Figure 3:
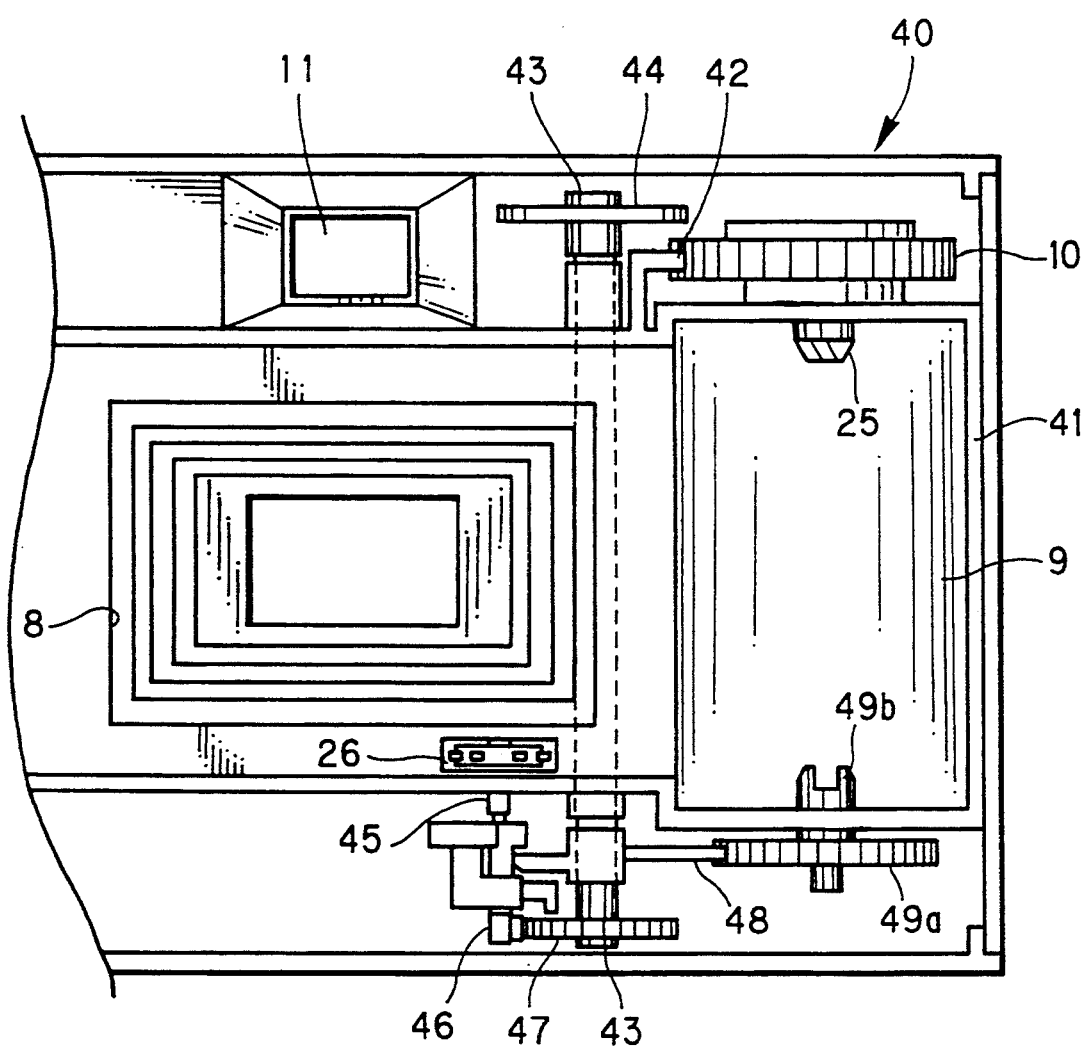
FIG. 3 is a fragmentary rear side view of a film package, with its rear cover section broken away, according to a second embodiment of the invention.

FIG. 3 illustrates a film package according to another embodiment of the invention, wherein a film stop mechanism as well as a sprocket 26 are disposed in a lower portion of a package body 40.

A film advance wheel 10 is rotatably mounted on top of a cartridge chamber 9 which is disposed on the right side in a main body section 41 when viewed from the rear. A fork 25 formed integrally with the wheel 10 protrudes into the cartridge chamber 9, so as to engage an upper end of a spool of a cartridge held in the cartridge chamber 9. An anti-reversal pawl 42, which is formed integrally with the main body section 41 or a rear cover section (omitted for clarity) of the package body 40, meshes with gear teeth of the film advance wheel 10 so as to prevent the film advance wheel 10 from rotating in a reverse direction to the film winding direction.

A frame counter disc 44 having no gearing is disposed in the vicinity of the film advance wheel 10. The frame counter disc 44 is coupled to the sprocket 26 through a shaft 43 in the following manner. Namely, the sprocket 26 is disposed below an exposure frame 8 so as to engage in successive perforations formed on one longitudinal side of a film contained in the film package. The sprocket 26 is coupled to a one pitch advance member 46 through a shaft 45, and the one pitch advance member 46 meshes with a frame advance gear 47. When the film winding wheel 10 is rotated to wind up or advance the film 2, the frame advance gear 47 is thereby rotated by one pitch through the one pitch advance member 46 in response to the one revolution of the sprocket 26 that is caused by the one frame advance of the film 2. Because the frame advance gear 47 is rigidly mounted on the lower end of the shaft 43 and the frame counter disc 44 is rigidly mounted on the upper end of the same shaft 43, the frame counter disc 44 is rotated by one step to count down the number of unexposed picture frames in correspondence with the one pitch of the frame advance gear 47.

Furthermore, a lock pawl 48 is rotatably mounted on the shaft 43 below the exposure frame 8, so as to be brought into engagement with a film stop gear 49a when it is detected by the sprocket 26 that the film 2 has been advanced by one frame. The film stop gear 49a is disposed on the bottom of the cartridge chamber 9, and a fork 49b secured to the film stop gear 49a protrudes into the cartridge chamber 9 so as to engage the lower end of the spool of the cartridge. Therefore, so long as the film stop gear 49a is locked by the lock pawl 48, the film winding wheel 10 is also locked. The lock pawl 48 is released at the next shutter release. These film advance mechanisms are also coupled to a self-cocking mechanism (not shown) in a conventional manner.

Figure 7:
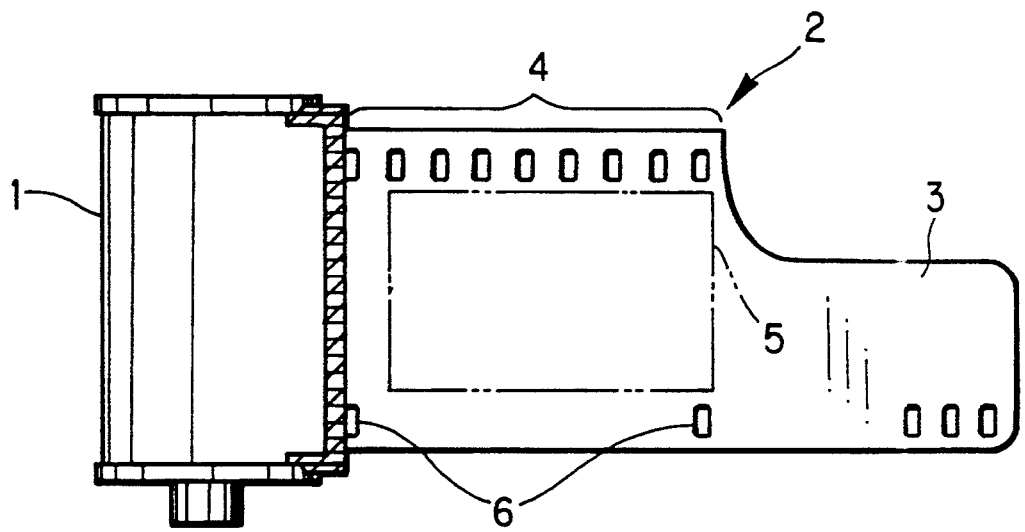
FIG. 7 is a view of a new type of photographic film having one perforation on one side of each film recording area and eight perforations on the opposite side thereof.
Figure 8:
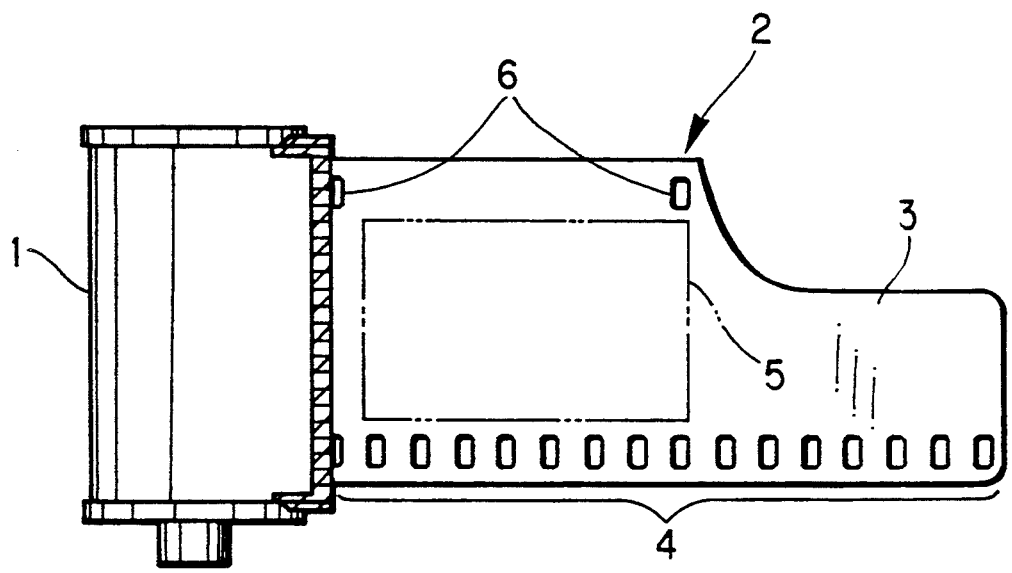
FIG. 8 is a view of a modification of the photographic film shown in FIG. 7.
Figure 9:
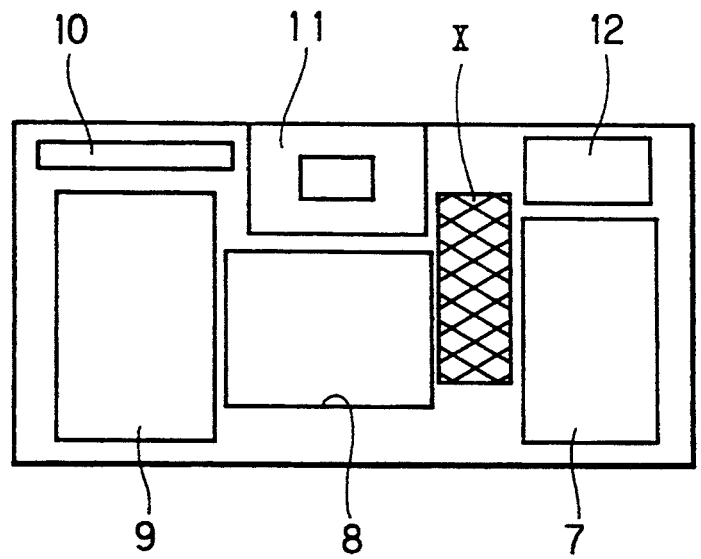
FIG. 9 is a schematic view showing the interior arrangement of a conventional film package, viewed from the front thereof.
Figure 10:
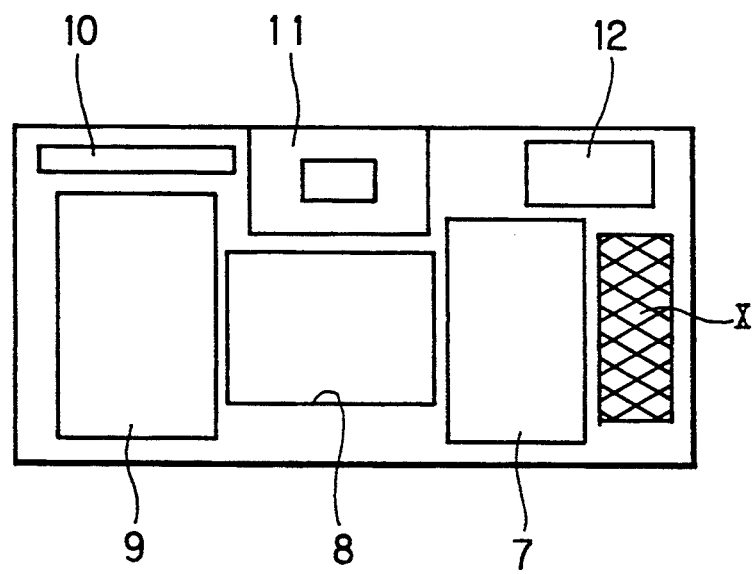
FIG. 10 is a view similar to FIG. 9, but showing the interior arrangement of another conventional film package.

Because the sprocket is disposed below the exposure frame in the film package of the present invention, the film package can contain not only a new format 35 mm roll film as shown in FIG. 7, but also a conventional format 35 mm roll film having successive perforations along both longitudinal side edges. Moreover, most of the components of the film package of the invention may be the same as in conventional film packages, so that the film package of the invention may also be manufactured at as low a cost as conventional film packages.

Figure 4:
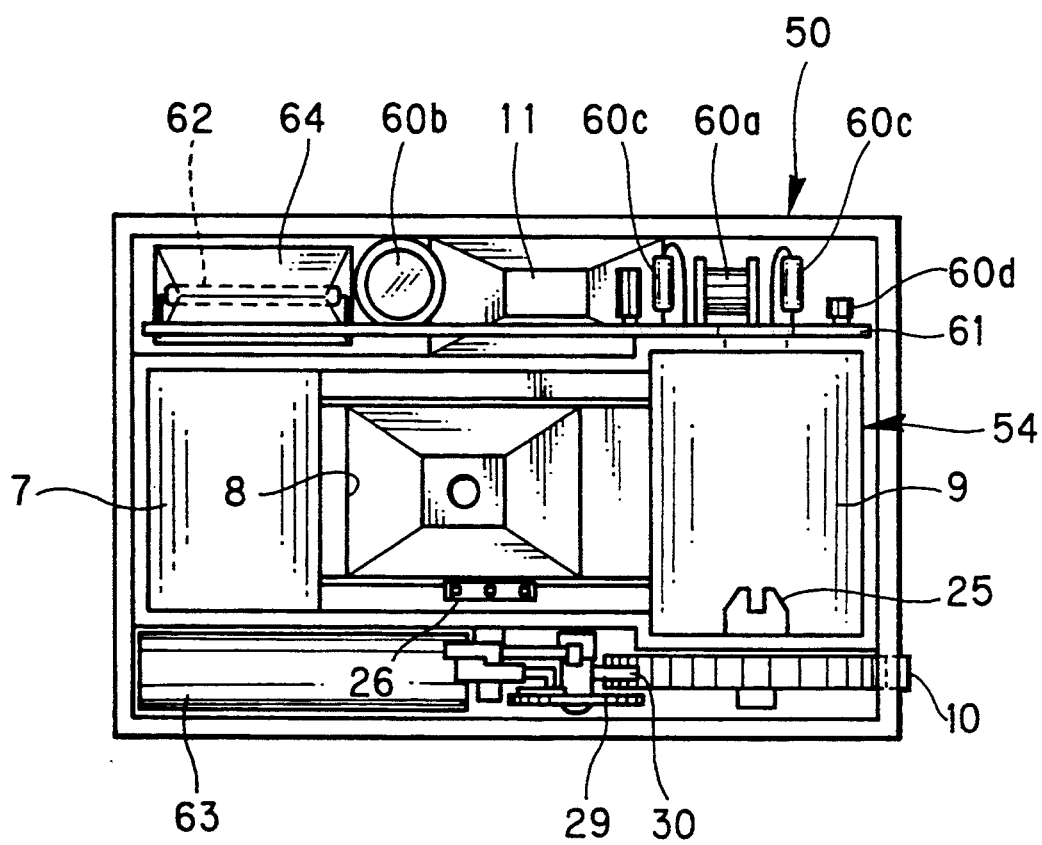
FIG. 4 is a rear side view of a film package with a flash unit, with its rear cover section broken away, according to a third embodiment of the invention.
Figure 5:
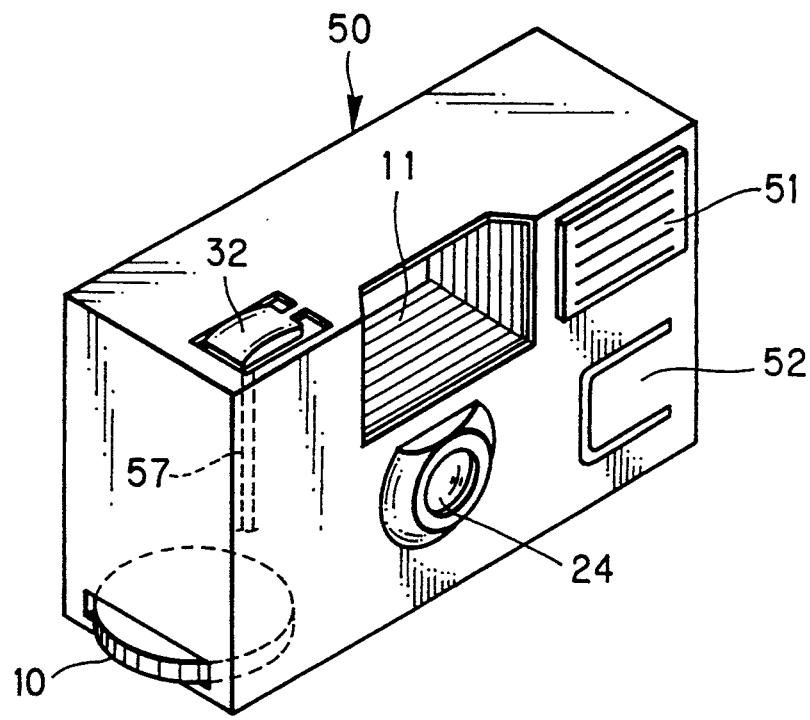
FIG. 5 is a front perspective view of the film package shown in FIG. 4.
Figure 6:
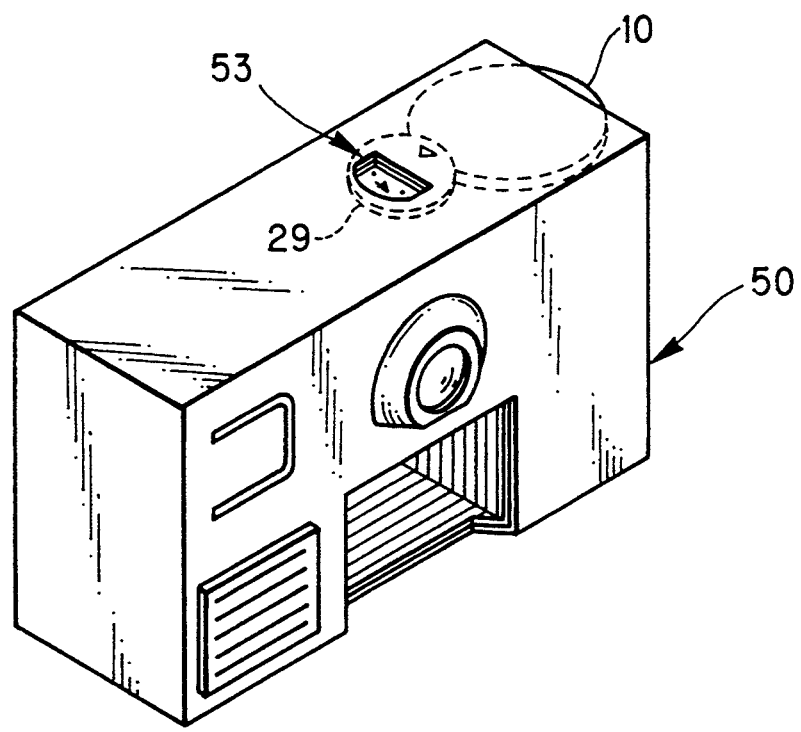
FIG. 6 is a perspective view of the film package of FIG. 5 in the upside down position.

FIGS. 4–6 illustrate a film package with flash unit according to another embodiment of the invention. In a package body 50, a taking lens 24 is disposed in a front middle portion, a viewfinder 11 is disposed above the taking lens 24, and a light emitting portion 51 of the flash unit is disposed on the right side of the viewfinder 11 when viewed from the front. A flash charge switch 52 is disposed below the light emitting portion 51, and a shutter release button 32 is disposed on a top wall portion of the package body 50 on the left side when viewed from the front.

The remarkable difference from conventional film packages is that a film winding wheel 10 and a frame counter disc 29 as well as a sprocket 26 are disposed in a lower portion of the package body 50. Also, a frame number display window 53 is formed on a bottom wall portion of the package body 50 in alignment with the frame counter disc 29.

More specifically, in a main body section 54, as shown from the rear in FIG. 4, an exposure chamber forming an exposure frame 8 is disposed in the middle, and a cartridge chamber 9 and a film roll chamber 7 are respectively disposed on the right and left sides of the exposure frame 8 when viewed from the rear. The film winding wheel 10 is rotatably mounted below the cartridge chamber 9, and a fork 25 integrally formed on the film winding wheel 10 protrudes into the bottom of the cartridge chamber 9 so as to engage a lower end of a spool of a film cartridge held in the cartridge chamber 9.

The sprocket 26 is disposed below the exposure frame 8 so as to be engaged in successive perforations formed along a longitudinal side edge of a film which is located below the exposure frame in the film package. The sprocket 26 cooperates with a frame counter disc 29, a film stop mechanism comprising a lock pawl 30, and a self-cocking mechanism (not shown), all in a similar manner as described with respect to FIGS. 1 and 2. However, because all of these mechanisms including the film winding wheel 10 are disposed in a lower portion of the package body 50, the lock pawl 30 is adapted to lock the film winding wheel 10 directly, and the coupling of the sprocket 26 through the shaft 27 as shown in FIGS. 1 and 2 is therefore unnecessary.

According to the arrangement as set forth above, space for the electric components 60a to 60d of the flash unit is provided in an upper portion of the package body 50, which is normally occupied by the film advance mechanism and the frame number count mechanism in conventional film packages. The electric elements including a transformer 60a, a capacitor 60b, resistors 60c and transistors 60d, for instance, are mounted on a printed circuit board 61 which is disposed horizontally in the top of the main body section 54. The printed circuit board 61 is connected to a discharge tube 62 of the light emitting portion 51 of the flash unit. The printed circuit board 61 is also connected to the flash charge switch 52 for charging the capacitor 60b with power supplied from a battery 63, though this latter circuit is not shown for the sake of clarity. A reflector 64 is provided surrounding the discharge tube 62.

It should be noted that it is preferable, in view of reducing the size of the film package, to dispose the capacitor 60b between the viewfinder 11 and the reflector 64 of the light emitting portion 51 in a direction of the optical axis of the taking lens 24, and to dispose the other electric elements 60a, 60c and 60d above the cartridge chamber 9. The battery 63 is preferably disposed horizontally below the film roll chamber 7 and the exposure frame 8.

Although the shutter release button 32 is disposed on a top wall portion of the package body 50 as is conventional, the actuation of the release button 32 is reliably transmitted to a shutter mechanism (not shown) through a rod 57 as is shown by dashed line in FIG. 5.

Since the space for electric elements 60a to 60d and 61 of the flash unit is in an upper portion of the package body 50 instead of on a horizontal side of the film roll chamber 7 as in conventional units, the horizontal length of the package body 50 may be less than that of conventional film packages.

Moreover, because the printed circuit board 61 is disposed horizontally in the top of the main body section 54, the electric elements 60a to 60d as well as the printed circuit board 61 are better protected from the shocks that occur when the film package 50 is put on a desk or the like, which in conventional film packages can be so intense as to result in separation of the soldered connections between the electric elements 60a to 60d and the printed circuit board 61. Accordingly, the arrangement of the invention is preferable for preventing failure of the flash unit.

Although the film winding wheel 10 protrudes from the package body through a side wall portion thereof in FIGS. 4 to 6, it is preferable to make the wheel 10 protrude through a front or rear wall portion. It is alternatively possible to omit the film stop gear 49a in the embodiment shown in FIG. 3, and instead, the film winding wheel 10 may be mounted on the bottom of the cartridge chamber 9, so as to cause the lock pawl 48 to stop the film winding wheel 10 directly. It is also possible to omit the frame number display disc 44 of FIG. 3 if the frame advance wheel 47 has a frame number display thereon and an aligned frame number display window is formed on a bottom wall portion of the package body 40.

While the present invention has been described in detail with reference to various preferred embodiments shown in the drawings, the invention is not to be considered as limited to the above-described embodiments. On the contrary, various modifications may be made without departing from the scope of the invention as defined by the appended claims.

What is claimed is:

1. A lens-fitted photographic film package having a taking lens, a shutter mechanism and an exposure frame and containing a roll of unexposed photographic film and a cartridge for winding up said photographic film therein after each exposure, said lens-fitted photographic film package further comprising:

a film roll chamber holding said roll of said unexposed photographic film therein;

a cartridge chamber disposed on one horizontal side of said exposure frame opposite said film roll chamber and holding said cartridge therein;

a film winding device rotatably mounted on said cartridge chamber and engaging a first end of a spool of said cartridge so as to permit rotation of said spool in a first direction to wind up said photographic film thereon; and a sprocket disposed below said exposure frame so as to engage perforations of said photographic film formed along a first longitudinal side edge thereof passing below said exposure frame, said sprocket being rotated by movement of said photographic film, rotation of said sprocket causing said shutter mechanism to be cocked; wherein the film has plural perforations per frame along said first longitudinal side edge, and only one perforation per frame along a second longitudinal side edge opposite said first longitudinal side edge and above said exposure frame.

2. The lens-fitted photographic film package as recited in claim 1, further comprising:

film stop means coupled to said sprocket for stopping said spool from rotating each time said sprocket is rotated by a predetermined amount corresponding to movement of said photographic film by one picture frame;

frame number count means coupled to said sprocket for counting down a number of unexposed picture frames on said photographic film each time said sprocket is rotated by said predetermined amount; and a frame number display window displaying said number of unexposed picture frames.

3. The lens-fitted photographic film package as recited in claim 2, wherein said film winding device comprises a winding wheel mounted on said cartridge chamber so as to be manually rotatable in said first direction, and a fork secured to said winding wheel and engaging said first end of said spool.

4. The lens-fitted photographic film package as recited in claim 3, wherein said photographic film has a tongue formed adjacent said first longitudinal side edge thereof, and one frame index perforation for each frame recording area, formed along a second longitudinal side edge thereof opposite said first longitudinal side edge.

5. The lens-fitted photographic film package as recited in claim 4, wherein said winding wheel is disposed above said cartridge chamber.

6. The lens-fitted photographic film package as recited in claim 5, wherein said film stop means comprises a rotary shaft extending vertically between said cartridge chamber and said exposure frame and rotatable synchronously with said sprocket, a cam mounted on an upper end of said rotary shaft, and a pivotal pawl engaging with said winding wheel so as to stop rotation of said winding wheel when said cam makes one revolution.

7. The lens-fitted photographic film package as recited in claim 6, wherein said frame number count means comprises a display disc which is disposed above said exposure frame and has indicia on one side thereof for indicating the number of unexposed frames through said frame number display window formed on a top wall portion of said lens-fitted photographic film package, said display disc having gear teeth formed around a periphery thereof and coupled to said sprocket through an engagement between said gear teeth of said display disc and a one pitch advance member mounted to said shaft, so that said display disc rotated by a predetermined amount in synchronism with said sprocket.

8. The lens-fitted photographic film package as recited in claim 3, wherein said winding wheel, said fork and said film stop means are disposed below said cartridge chamber, and said film stop means comprises a cam rotating with said sprocket and a pawl coupled to said cam and brought into engagement with said winding wheel so as to stop rotation of said winding wheel when said cam makes one revolution.

9. The lens-fitted photographic film package as recited in claim 5, wherein said stop means comprises a gear wheel rotatably mounted below said cartridge chamber, a second fork secured to said gear wheel and engaging a second end of said spool opposite to said first end, and a pawl coupled to said sprocket and brought into engagement with said gear wheel so as to selectively stop rotation of said gear wheel.

10. The lens-fitted photographic film package as recited in claim 5, wherein said frame number count means comprises a display disc which is disposed below said exposure frame and has indicia on one side thereof for indicating an available frame number through said frame number display window formed on a bottom wall portion of said lens-fitted photographic film package, said display disc having gear teeth formed around a periphery thereof and coupled to said one pitch advance member which is integrally formed with said sprocket, so as to be rotated by a predetermined amount in synchronism with said sprocket.

11. The lens-fitted photographic film package as recited in claim 5, wherein said frame number count means comprises a display disc which is disposed above said exposure frame and has indicia on one side thereof for indicating an available frame number through said frame number display window formed on a top wall portion of said lens-fitted photographic film package, and a second gear wheel which is coupled to and rotatable synchronously with said display disc through a shaft extending vertically between said cartridge chamber and said exposure frame, said second gear wheel being coupled to a one pitch advance member which is formed integrally with said sprocket, so as to rotate said display disc by a predetermined amount when said sprocket makes one revolution.

12. The lens-fitted photographic film package as recited in claim 2, further comprising a flash unit having a discharge tube, a reflector for reflecting flash light from said discharge tube toward a photographic subject, and an electric circuit for activating said discharge tube, said electric circuit including a printed circuit board having electric components mounted thereon, wherein said discharge tube, reflector and said printed circuit board are disposed in a first space defined above said cartridge chamber and said film roll chamber, and wherein said film winding means, said film stop means, and said frame number count means are disposed in a second space defined below said cassette chamber and said exposure frame.

13. The lens-fitted photographic film package as recited in claim 12, wherein said printed circuit board is oriented horizontally within said film package.

14. The lens-fitted photographic film package as recited in claim 13, wherein said electric components are disposed on either horizontal side of a viewfinder formed above said exposure frame.

15. The lens-fitted photographic film package as recited in claim 14, wherein said electric components include a capacitor disposed adjacent said reflector which in turn is disposed above said film roll chamber, said capacitor being oriented in a direction parallel to the optical axis of said taking lens, and said electric circuit further includes a battery for charging said capacitor, said battery being disposed below said film roll chamber and oriented horizontally within said film package.

16. The lens-fitted photographic film package as recited in claim 8, wherein said frame number count means comprises a display disc which is disposed below said exposure frame and has indicia on one side thereof for indicating an available frame number through said frame number display window formed on a bottom wall portion of said lens-fitted photographic film package, said display disc having gear teeth formed around a periphery thereof and coupled to said one pitch advance member which is integrally formed with said sprocket, so as to be rotated by a predetermined amount in synchronism with said sprocket.

17. The lens-fitted photographic film package as recited in claim 8, wherein said frame number count means comprises a display disc which is disposed above said exposure frame and has indicia on one side thereof for indicating an available frame number through said frame number display window formed on a top wall portion of said lens-fitted photographic film package, and a second gear wheel which is coupled to and rotatable synchronously with said display disc through a shaft extending vertically between said cartridge chamber and said exposure frame, said second gear wheel being coupled to a one pitch advance member which is formed integrally with said sprocket, so as to rotate said display disc by a predetermined amount when said sprocket makes one revolution.

18. The lens-fitted photographic film package as recited in claim 9, wherein said frame number count means comprises a display disc which is disposed above said exposure frame and has indicia on one side thereof for indicating an available frame number through said frame number display window formed on a top wall portion of said lens-fitted photographic film package, and a second gear wheel which is coupled to and rotatable synchronously with said display disc through a shaft extending vertically between said cartridge chamber and said exposure frame, said second gear wheel being coupled to a one pitch advance member which is formed integrally with said sprocket, so as to rotate said display disc by a predetermined amount when said sprocket makes one revolution.

19. A lens-fitted photographic film package having a taking lens, a shutter mechanism and an exposure frame and containing a roll of unexposed photographic film and a cartridge for winding up said photographic film therein after each exposure, said lens-fitted photographic film package further comprising:

a film roll chamber holding said roll of said unexposed photographic film therein;

a cartridge chamber disposed on one horizontal side of said exposure frame opposite said film roll chamber and holding said cartridge therein;

a film winding device rotatably mounted on said cartridge chamber and engaging a first end of a spool of said cartridge so as to permit rotation of said spool in a first direction to wind up said photographic film thereon;

said film having plural perforations per frame formed along a first longitudinal side thereof;

a sprocket engaging said plural perforations, said sprocket being rotated by movement of said photographic film, rotation of said sprocket causing said shutter mechanism to be cocked; and said film having only a single perforation per frame on a second longitudinal side edge thereof opposite said first longitudinal side edge, said single perforation serving as a one-frame index perforation whose detection indicates advance of the film by one frame.

20. The lens-fitted photographic film package as recited in claim 19, wherein said plural perforations per frame are disposed below said exposure frame and said single perforations per frame are disposed above said exposure frame.

* * * * *